US011930144B2

(12) United States Patent
Ogata

(10) Patent No.: US 11,930,144 B2
(45) Date of Patent: Mar. 12, 2024

(54) ENERGY-SAVING INFORMATION PROCESSING APPARATUS, IMAGE FORMING APPARATUS, AND METHOD FOR CONTROLLING ENERGY-SAVING INFORMATION PROCESSING APPARATUS

(71) Applicant: Hiroki Ogata, Tokyo (JP)

(72) Inventor: Hiroki Ogata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/183,318

(22) Filed: Mar. 14, 2023

(65) Prior Publication Data
US 2023/0300267 A1 Sep. 21, 2023

(30) Foreign Application Priority Data
Mar. 17, 2022 (JP) .................. 2022-043085
Nov. 22, 2022 (JP) .................. 2022-186585

(51) Int. Cl.
H04N 1/00 (2006.01)

(52) U.S. Cl.
CPC ..... *H04N 1/00896* (2013.01); *H04N 1/00029* (2013.01); *H04N 1/00076* (2013.01); *H04N 1/00408* (2013.01); *H04N 1/00477* (2013.01); H04N 2201/0094 (2013.01)

(58) Field of Classification Search
None
See application file for complete search history.

(56) References Cited

U.S. PATENT DOCUMENTS

| 2013/0052630 A1* | 2/2013 | Mine ............ G09B 7/02 434/353 |
| 2018/0241887 A1* | 8/2018 | Yamaguchi ............ G06F 3/12 |
| 2021/0084175 A1* | 3/2021 | Hitaka ............ H04N 1/00079 |
| 2022/0236420 A1* | 7/2022 | Maekawa ............ G01S 17/89 |

FOREIGN PATENT DOCUMENTS

| JP | 2009-010756 | | 1/2009 |
| JP | 2019-160249 | | 9/2019 |
| JP | 2019160249 A | * | 9/2019 |
| JP | 2020-129275 | | 8/2020 |
| JP | 2021-149749 | | 9/2021 |
| JP | 2021149749 A | * | 9/2021 |

* cited by examiner

*Primary Examiner* — Miya J Cato
*Assistant Examiner* — Pawan Dhingra
(74) *Attorney, Agent, or Firm* — IPUSA, PLLC

(57) ABSTRACT

An information processing apparatus that switches a normal mode and an energy-saving mode includes control circuitry, an operation unit, and a device. The control circuitry controls processing of the information processing apparatus. The operation unit includes a display. The device mounted on the control circuitry or the operation unit writes change information indicating change of an operation mode in response to switching between the normal mode and the energy-saving mode. The device has a limit to a number of times of writing. The control circuitry counts the number of times of writing of the change information into the device, predicts a life of the device on a basis of a count value of the number of times of writing, and diagnoses appropriateness of the count value used for prediction of the life of the device when an increase rate of the count value exceeds a predetermined increase rate.

6 Claims, 10 Drawing Sheets

FIG. 5

| STORAGE UNIT | | | | | | | | |
|---|---|---|---|---|---|---|---|---|
| | NUMBER OF TIMES BT1 OF ACTIVATION | NUMBER OF TIMES STR1 OF SHIFTS TO ENERGY SAVING (STANDBY MODE TO ENERGY-SAVING MODE) | NUMBER OF TIMES STB1 OF SHIFTS TO STANDBY (ENERGY-SAVING MODE TO STANDBY MODE) | NUMBER OF TIMES FWU1 OF FIRMWARE UPDATES | NUMBER OF TIMES BT2 OF ACTIVATION | NUMBER OF TIMES STR2 OF SHIFTS TO ENERGY SAVING (STANDBY MODE TO ENERGY-SAVING MODE) | NUMBER OF TIMES STB2 OF SHIFTS TO STANDBY (ENERGY-SAVING MODE TO STANDBY MODE) | NUMBER OF TIMES NFU2 OF WIRELESS COMMUNICATION |
| | STORAGE AREA A1 FOR PREDICTION OF LIFE OF TPM DEVICE | | | | STORAGE AREA A2 FOR PREDICTION OF LIFE OF NFC DEVICE | | | |

ENERGY-SAVING INFORMATION PROCESSING APPARATUS, IMAGE FORMING APPARATUS, AND METHOD FOR CONTROLLING ENERGY-SAVING INFORMATION PROCESSING APPARATUS

CROSS-REFERENCE TO RELATED APPLICATIONS

This patent application is based on and claims priority pursuant to 35 U.S.C. § 119(a) to Japanese Patent Application No. 2022-043085, filed on Mar. 17, 2022, and Japanese Patent Application No. 2022-186585 filed on Nov. 22, 2022, in the Japan Patent Office, the entire disclosures of which are hereby incorporated by reference herein.

BACKGROUND

Technical Field

Embodiments of the present disclosure relate to an information processing apparatus, an image forming apparatus, and a method for controlling an information processing apparatus.

Related Art

A known image processing apparatus detects, at a time of activation of the power supply, whether or not configurations of devices mounted on a control board have been changed. In a case where a change is detected, the image processing apparatus performs self-diagnosis of each device mounted on the control board. In a case where there have been no changes in the configurations of the devices, the self-diagnosis is omitted. Therefore, this type of image processing apparatus shortens the activation time.

A known information processing apparatus counts, for each factor, the number of times of writing into a built-in device. In a case where the total of the count values exceeds a threshold, the information processing apparatus displays a message prompting the replacement of the device

SUMMARY

In an embodiment of the present disclosure, there is provided an information processing apparatus that switches a normal mode and an energy-saving mode with less power consumption than the normal mode. The information processing apparatus includes control circuitry, an operation unit, and a device. The control circuitry controls processing of the information processing apparatus. The operation unit includes a display. The device mounted on the control circuitry or the operation unit, writes change information indicating change of an operation mode of the information processing apparatus in response to switching between the normal mode and the energy-saving mode. The device has a limit to a number of times of writing. The control circuitry counts the number of times of writing of the change information into the device, predicts a life of the device on a basis of a count value of the number of times of writing of the change information, and diagnoses appropriateness of the count value used for prediction of the life of the device when an increase rate of the count value exceeds a predetermined increase rate.

In another embodiment of the present disclosure, there is provided an image forming apparatus that switches between a normal mode and an energy-saving mode with less power consumption than the normal mode. The image forming apparatus includes an image former, control circuitry, an operation unit, and a device. The image former forms an image. The control circuitry controls an operation of the image former. The operation unit includes a display. The device mounted on the control circuitry or the operation unit writes change information indicating change of an operation mode of the image forming apparatus in response to switching between the normal mode and the energy-saving mode. The device has a limit to a number of times of writing. The control circuitry counts the number of times of writing of the change information into the device, predicts a life of the device on a basis of a count value of the number of times of writing of the change information; and diagnoses appropriateness of the count value used for prediction of the life of the device when an increase rate of the count value exceeds a predetermined increase rate.

In still another embodiment of the present disclosure, there is provided a method for controlling an information processing apparatus that includes control circuitry and an operation unit with a display and switches between a normal mode and an energy-saving mode with less power consumption than the normal mode of the information processing apparatus. The method incudes writing, counting, predicting, and diagnosing. The writing writes change information indicating change of an operation mode of the information processing apparatus in response to switching between the normal mode and the energy-saving mode, into a device having a limit to a number of times of writing. The counting counts the number of times of writing of the change information to the device. The predicting predicts a life of the device on a basis of a counted value of the number of times of writing. The diagnosing diagnoses appropriateness of the count value used for prediction of the life of the device when an increase rate of the count value exceeds a threshold.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is an explanatory diagram illustrating an example of various numbers of times stored in a storage unit of FIG. 3;

Figure 1:
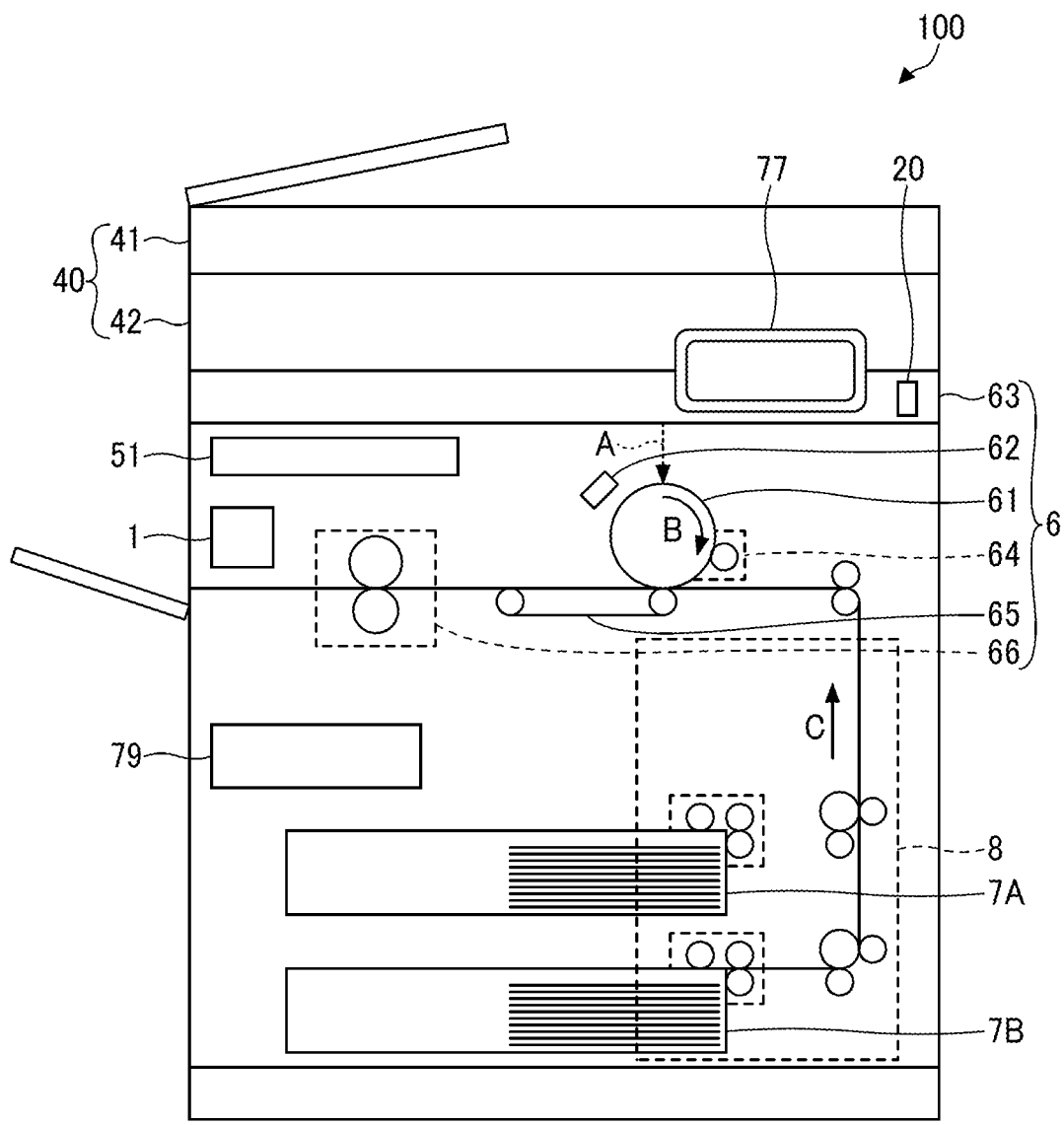
FIG. 1 is a general-arrangement diagram illustrating an example of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to the present disclosure, when self-diagnosis regarding the state of a device mounted on an apparatus is performed, a deterioration in the prediction precision of a predicting unit that predicts the life of the device is suppressed. As a result, the precision in a request to a service base for repair of the apparatus is improved, and the occurrence of useless cost due to replacement, such as replacement of a device whose life has not ended, or replacement of a board on which a device whose life has not ended is mounted, is suppressed.

Hereinafter, embodiments will be described with reference to the drawings. Hereinafter, examples in which the present disclosure is applied to an image forming apparatus will be described. However, the present disclosure is applicable to electronic equipment, such as an information processing apparatus in which a trusted platform module (TPM) device and a near-field communication (NFC) device are mounted on a control board. The TPM device and the NFC device may be mounted on different control boards, respectively, or may be mounted on one control board. The present disclosure has a significant effect, for example, in a case where the present disclosure is applied to an information processing apparatus that requires repair maintenance by a serviceperson at a time of the breakdown.

General Arrangement Example of Image Forming Apparatus

FIG. 1 is a general-arrangement diagram illustrating an example of an image forming apparatus according to an embodiment of the present disclosure. An image forming apparatus 100 is a multifunction peripheral (multifunction peripheral/printer/product (MFP)) having a copying function, a facsimile (FAX) function, a printing function, a scanner function, and the like. The image forming apparatus 100 is an example of an information processing apparatus. The image forming apparatus 100 may have a function for storing an input image, a function for distributing an input image, or the like. For example, the input image is a document read by the scanner function, an image input by the FAX function, or the like.

The image forming apparatus 100 may communicate with an external apparatus, such as a personal computer (PC), and may operate according to an instruction received from the external apparatus. In the embodiment, an image processed by the image forming apparatus 100 may include not only image data including an image but also text data not including an image.

The image forming apparatus 100 is what is called an electrophotographic image forming apparatus. The image forming apparatus 100 selectively exposes a charged surface of a photoconductor to form an electrostatic latent image, sticks toner to the formed electrostatic latent image, transfers the stuck toner to a recording medium, such as a sheet, and fixes the toner.

As illustrated in FIG. 1, the image forming apparatus 100 includes an operation unit 77, an activation switch 20, a control board 51, a reading unit 40, an engine control unit 79, a printer unit 6, sheet feeding cassettes 7A and 7B, a conveying unit 8, and a power supply device 1. The image forming apparatus 100 contains the control board 51, the engine control unit 79, the printer unit 6, the sheet feeding cassettes 7A and 7B, and the conveying unit 8, but FIG. 1 illustrates a state where the inside is seen through.

The operation unit 77 receives various input according to a user's operation and displays various types of information on a display unit, as user interaction for the image forming apparatus 100. For example, the information displayed on the operation unit 77 is information indicating an input operation, information indicating an operation status of the image forming apparatus 100, information indicating a setting state of the image forming apparatus 100, or the like.

For example, the operation unit 77 may include a liquid crystal display (LCD) having a touch panel function. Alternatively, the operation unit 77 may include an organic electro-luminescence (EL) display having a touch panel function. Alternatively, the operation unit 77 may include, in addition to a display having a touch panel function, at least one of an operation unit, such as hardware keys, or a display unit, such as a lamp.

The activation switch 20 is a switch for activating a power supply of the image forming apparatus 100. When the power supply of the image forming apparatus 100 is in an OFF state, the activation switch 20 is pressed down to activate the image forming apparatus 100. When the image forming apparatus 100 is activated, the activation switch 20 is pressed down to switch the image forming apparatus 100 to the OFF state. The power supply of the image forming apparatus 100 is turned on/off not only by operating the activation switch 20, but may also be turned on/off on the basis of an activation instruction or an ending instruction from an external apparatus.

Mounted on the control board 51 is a plurality of electronic parts including a controller or control circuitry, such as a central processing unit (CPU) that controls operations of the entire image forming apparatus 100. The control board 51 is an example of a main-unit that controls operations of the entire image forming apparatus 100. For example, the electronic parts mounted on the control board 51 control drawing processing, communication processing, input from the operation unit 77, and the like. For example, the electronic parts mounted on the control board 51 control the image forming apparatus 100 on the basis of operation received by the operation unit 77 to perform a copying operation or the like.

The electronic parts mounted on the control board 51 may control the image forming apparatus 100 on the basis of an instruction received from external equipment, such as a PC. In a case where pressing-down of the activation switch 20 is sensed, in a case where an unusualness of the image forming apparatus 100 is sensed, or in other such cases, the electronic parts mounted on the control board 51 may make the image forming apparatus 100 execute a predetermined operation.

Instead of a processor, such as the CPU, the control board 51 may include a semiconductor chip, such as a system-on-chip (SoC) or a field-programmable gate array (FPGA). The SoC or the FPGA may include a plurality of components, such as a CPU 53, a north bridge (NB) 55, and a south bridge (SB) 57, illustrated in FIG. 2. In this case, the SoC and an application-specific integrated circuit (ASIC) may be coupled by a Peripheral Component Interconnect Express (PCI-Express) (registered trademark) bus. Alternatively, the control board 51 may include a CPU, and an SoC or an FPGA. An SoC and an FPGA are mounted on the control board 51 to reduce the size of the control board 51.

The reading unit 40 includes, for example, an auto document feeder (ADF) 41 and a scanner unit 42. The ADF 41 sequentially conveys documents placed on the ADF 41 to the scanner unit 42, so that the documents are optically read to generate image data. The scanner unit 42 optically reads a document placed on a transparent document table to generate image data.

On the basis of the image data generated by the reading unit 40, the engine control unit 79 generates control signals for controlling the printer unit 6 and the conveying unit 8. For example, the engine control unit 79 may be in a form of a circuit board on which a circuit for generating the control signals on the basis of the image data is mounted.

The printer unit 6 functions as an image forming unit that forms an image. The printer unit 6 includes a photoconductor drum 61, a charging unit 62, a writing unit 63, a developing unit 64, a conveying belt 65, and a fixing unit 66. The charging unit 62 charges the outer circumferential surface of the photoconductor drum 61. On the basis of image data read by the reading unit 40, the writing unit 63 exposes the charged photoconductor drum 61 to write an electrostatic latent image on the photoconductor drum 61. The developing unit 64 develops, with toner, the latent image written on the photoconductor drum 61. The conveying belt 65 conveys a recording medium on which a toner image will be formed. The fixing unit 66 fixes toner on a recording medium, to the recording medium to form a toner image on the recording medium.

The sheet feeding cassettes 7A and 7B contain recording media, such as sheets, before toner image formation. For example, the sheet feeding cassettes 7A and 7B contain recording media having different sizes. FIG. 1 illustrates an example in which the two sheet feeding cassettes 7A and 7B are provided in the image forming apparatus 100, but the number of sheet feeding cassette(s) may be one or three or more.

The conveying unit 8 includes various rollers, and conveys a recording medium contained in the sheet feeding cassette 7A or the sheet feeding cassette 7B to the printer unit 6. An arrow C in FIG. 1 indicates a conveyance direction of the recording medium. For example, the power supply device 1 generates a plurality of types of direct-current voltages on the basis of an alternating-current power supply, such as mains electricity, and supplies the generated direct-current voltage to each unit constituting the image forming apparatus 100.

The user operates a function-switching key or the like of the operation unit 77 to select a document box function, a copying function, a printer function, a facsimile function, or the like, so that the image forming apparatus 100 switches to a state in which each function is operable. When the document box function is selected, the operation mode of the image forming apparatus 100 becomes a document box mode. When the copying function is selected, the operation mode of the image forming apparatus 100 becomes a copying mode. When the printer function is selected, the operation mode of the image forming apparatus 100 becomes a printer mode. When the facsimile function is selected, the operation mode of the image forming apparatus 100 becomes a facsimile mode.

Hereinafter, an example of an image forming operation for a case where the image forming apparatus 100 is set to the copying mode will be described. Hereinafter, an example in which the printer unit 6 forms an image by a monochrome electrophotographic scheme will be described, but an image may be formed by a color electrophotographic scheme, an inkjet scheme, or the like. Further, the image forming scheme is not limited to these examples.

In the copying mode, the image forming apparatus 100 reads, with the reading unit 40, image information of each document to be copied, to generate image data. The image forming apparatus 100 uniformly charges the outer circumferential surface of the photoconductor drum 61 with the charging unit 62 in the dark. Next, the image forming apparatus 100 exposes the photoconductor drum 61 with light emitted from the writing unit 63 indicated by a dotted arrow A in FIG. 1 to form an electrostatic latent image on the outer circumferential surface of the photoconductor drum 61. An arrow B in FIG. 1 indicates a rotation direction of the photoconductor drum 61.

The image forming apparatus 100 operates the developing unit 64 to make the electrostatic latent image visible with the toner. As a result, a toner image is formed on the photoconductor drum 61. Next, the image forming apparatus 100 transfers the toner image on the photoconductor drum 61 to a recording medium on the conveying belt 65. Then the image forming apparatus 100 heats and melts the toner forming the toner image on the recording medium with a heater or the like of the fixing unit 66 to fix the toner image on the recording medium. Then the image forming apparatus 100 ejects the recording medium on which the toner image is fixed.

The operation unit 77 may be controlled by the control board 51 or may be controlled by a control circuit different from the control board 51. In this case, a control circuit of the control board 51 is coupled to the control circuit of the operation unit 77 to communicate with each other. The control board 51 controls the entire image forming apparatus 100 including the operation unit 77.

Hardware Configuration Example of Image Forming Apparatus

Figure 2:
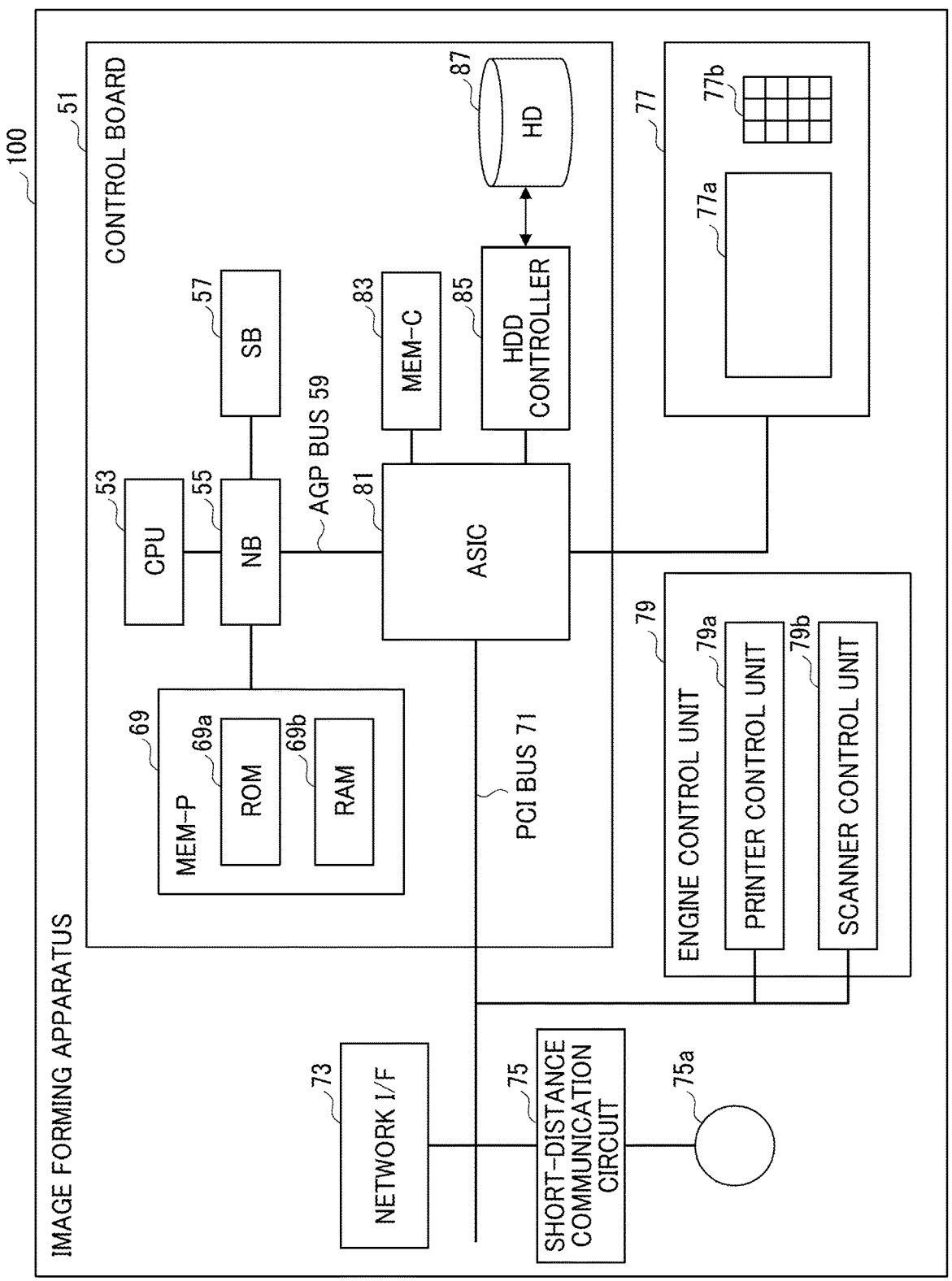
FIG. 2 is a block diagram illustrating an example of a hardware configuration of the image forming apparatus of FIG. 1.

FIG. 2 is a block diagram illustrating an example of a hardware configuration of the image forming apparatus 100 of FIG. 1. The image forming apparatus 100 includes the control board 51, a short-distance communication circuit 75, the engine control unit 79, the operation unit 77, and a network interface (I/F) 73. A hardware configuration of the image forming apparatus 100 is not limited to the configuration illustrated in FIG. 2.

For example, the control board 51 includes a CPU 53, which is a main part of a computer, a storage unit MEM-P 69, a north bridge (NB) 55, and a south bridge (SB) 57. The control board 51 also includes an application-specific integrated circuit (ASIC) 81, a MEM-C (local memory) 83, a hard disk drive (HDD) controller 85, and a hard disk (HD) 87. The NB 55 is coupled to the ASIC 81 by an accelerated graphics port (AGP) bus 59.

The CPU 53 is a control unit that controls the entire image forming apparatus 100, and controls, for example, drawing processing, communication processing, input from the operation unit 77, and the like. The NB 55 couples the CPU 53 to the storage unit MEM-P 69, the SB 57, and the AGP bus 59. For example, the NB 55 includes a memory controller that controls reading and writing from and into the storage unit MEM-P 69, a Peripheral Component Interconnect (PCI) master, and an AGP target. Hereinafter, the storage unit MEM-P 69 is also simply referred to as the storage unit 69.

The storage unit 69 includes, for example, a read-only memory (ROM) 69a and a random-access memory (RAM) 69b. The ROM 69a stores programs, data, and the like for implementing each function of the image forming apparatus 100. The RAM 69b stores programs and data loaded from the ROM 69a, and stores drawing data at a time of memory printing, and the like.

Programs stored in the RAM 69b may be transferred from a recording medium. The recording medium is a compact disc read-only memory (CD-ROM), a compact disc-recordable (CD-R), a digital versatile disc (DVD), or the like detachably loaded in an input/output interface of the image forming apparatus 100. In the recording medium, programs and data are recorded as files in an installable format or an executable format.

The SB 57 couples the NB 55 to a PCI device and a peripheral device. The ASIC 81 includes hardware for image processing, and serves as a bridge that couples the AGP bus 59, a PCI bus 71, the HDD controller 85, and the storage unit MEM-C 83 to each other. For example, the ASIC 81 includes a PCI target, an AGP master, an arbiter that forms the core of the ASIC 81, and a memory controller that controls the storage unit MEM-C 83. The ASIC 81 also includes a plurality of direct memory access controllers (DMACs) that performs, with hardware logic or the like, rotation of image data, and a PCI unit that performs data transfer between the scanner unit 42 and the printer unit 6 via the PCI bus 71.

To the ASIC 81, a universal serial bus (USB) or an Institute of Electrical and Electronics Engineers 1394 (IEEE 1394) bus may be coupled.

The storage unit MEM-C 83 functions as a local memory used as an image buffer for copying, and a code buffer. In the HD 87, image data, and font data and forms used at a time of printing are accumulated. The HDD controller 85 controls reading or writing of data from or into the HD 87 under the control of the CPU 53. The AGP bus 59 is a bus interface for a graphics accelerator card proposed to speed up graphics processing. The AGP bus 59 directly accesses the storage unit 69 at a high throughput to operate the graphics accelerator card at a high speed.

An antenna 75a is coupled to the short-distance communication circuit 75. The short-distance communication circuit 75 is a communication circuit, such as near-field communication (NFC) or Bluetooth (registered trademark). The short-distance communication circuit 75 may be mounted on a board mounted in the operation unit 77.

The network I/F 73 performs data communication using a communication network. The network I/F 73 is an example of a communication interface that transmits and receives information to and from the outside. The short-distance communication circuit 75 and the network I/F 73 are electrically coupled to the ASIC 81 via the PCI bus 71. The engine control unit 79 includes a printer control unit 79a that controls the printer unit 6 of FIG. 1, and a scanner control unit 79b that controls the scanner unit 42 of FIG. 1. At least one of the printer control unit 79a and the scanner control unit 79b may include an image processing function, such as error diffusion or gamma conversion.

The operation unit 77 includes a panel display unit 77a using a liquid crystal display, an organic EL display, or the like, and an input panel 77b using hardware keys or the like. The panel display unit 77a has a display function for displaying present setting values of the image forming apparatus 100, a selection screen, a replacement procedure of consumables, and the like in a still image or a moving image. The selection screen displayed on the panel display unit 77a functions as a touch panel that receives input from the user. The input panel 77b includes a numeric keypad that receives a setting value of a condition related to image formation, such as a density setting condition, a start key that receives a copying start instruction, and the like. The operation unit 77 is coupled to the ASIC 81, but may be coupled to the SB 57.

Figure 3:
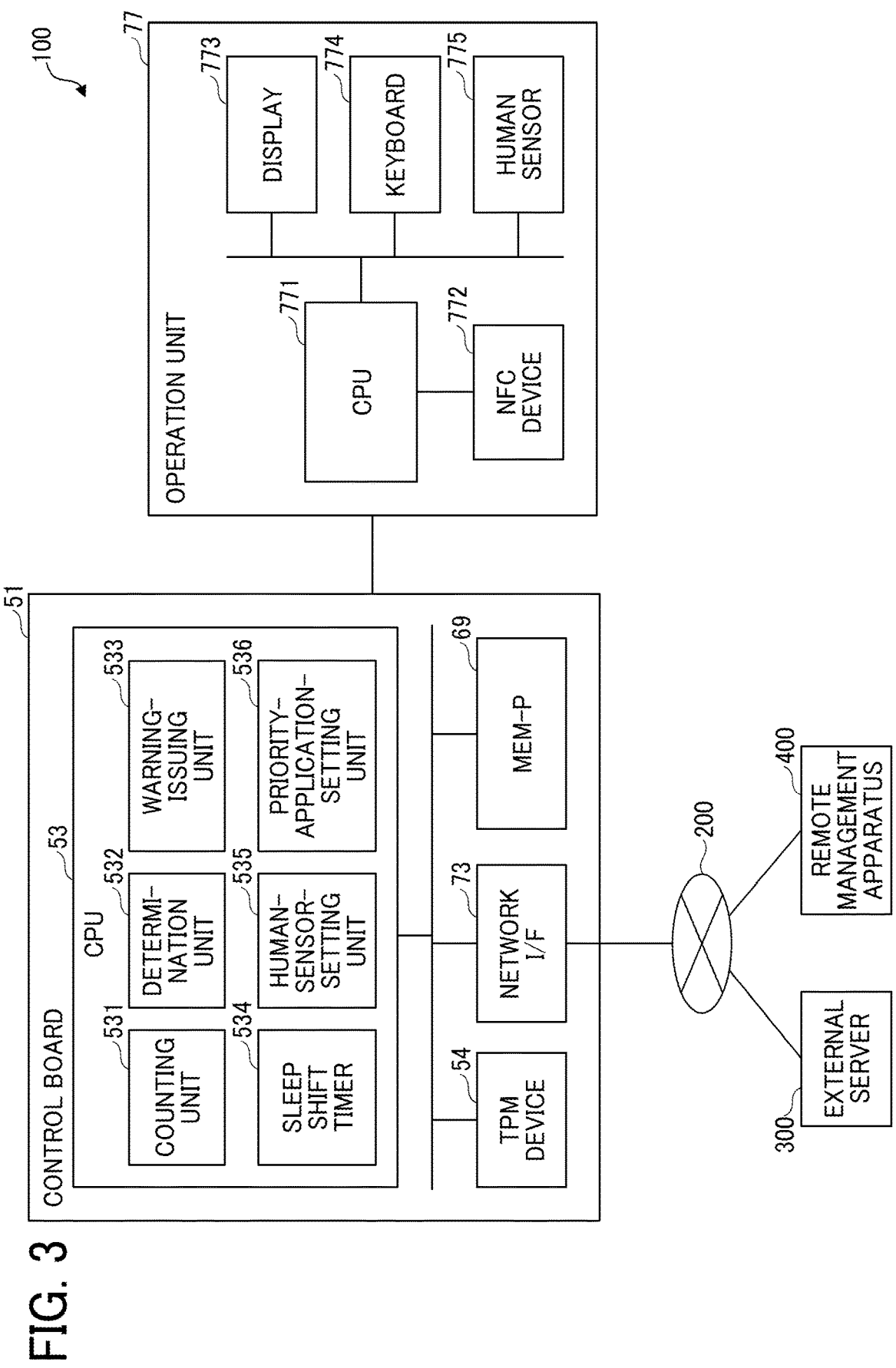
FIG. 3 is a block diagram illustrating an example of a functional configuration of the image forming apparatus of FIG. 2.

Functional Configuration Example of Image Forming Apparatus Functioning as Life-Predicting Device FIG. 3 is a block diagram illustrating an example of a functional configuration of the image forming apparatus 100 of FIG. 2. FIG. 3 illustrates an outline of main functional units mainly used to predict the life of the image forming apparatus 100. The CPU 53 mounted on the control board 51 controls the copying function, the FAX function, the printing function, the scanner function, and the like of the image forming apparatus 100, and also functions as a life-predicting device that predicts the life of the image forming apparatus 100. The image forming apparatus 100 also functions as an information processing apparatus that processes information of image data. Therefore, FIG. 3 may be applied to an information processing apparatus having a function of a life-predicting device that predicts the life of the information processing apparatus.

The control board 51 includes, in addition to the CPU 53, the network I/F 73, and the storage unit 69 illustrated in FIG. 2, a Trusted Platform Module (TPM) device 54 having various functions related to security. The operation unit 77 includes a CPU 771, an NFC device 772, a display 773, a keyboard 774, and a human sensor 775. The NFC device 772 is an example of the short-distance communication circuit 75 illustrated in FIG. 2, and is mounted on the operation unit 77 in FIG. 3. The display 773 and the keyboard 774 correspond to the panel display unit 77a and the input panel 77b illustrated in FIG. 2, respectively. The display 773 is an example of a display unit.

At a time of activation of the image forming apparatus 100, at a time of a shift from a standby mode to an energy-saving mode, and at a time of a return from the energy-saving mode to the standby mode, writing of change information indicating the change in the operation state of the image forming apparatus 100 occurs in the TPM device 54. In addition, at a time of an update on the firmware, writing of change information indicating the change in the operation state of the image forming apparatus 100 occurs in the TPM device 54.

At a time of activation of the image forming apparatus 100, at a time of a shift from the standby mode to the energy-saving mode, at a time of a return from the energy-saving mode to the standby mode, and at a time of execution of communication by the NFC device 772, writing of change information occurs in the NFC device 772. The change information is information indicating the change in the operation state of the image forming apparatus 100. The TPM device 54 and the NFC device 772 have respective limits (upper limit values) on the number of times of the writing.

The CPU 53 mounted on the control board 51 executes a control program to implement functions of a counting unit 531, a determination unit 532, a warning-issuing unit 533, a sleep shift timer 534, a human-sensor-setting unit 535, and a priority-application-setting unit 536. Each of the counting unit 531, the determination unit 532, the warning-issuing unit 533, the sleep shift timer 534, the human-sensor-setting unit 535, and the priority-application-setting unit 536 may be implemented by hardware, or may be implemented by hardware and software that cooperate with each other. Various functional units implemented by the hardware may be provided outside the CPU 53.

The counting unit 531 counts the number of times of activation of the image forming apparatus 100, the number of times of shifts from the standby mode to the energy-saving mode of the image forming apparatus 100, and the number of times of returns from the energy-saving mode to the standby mode of the image forming apparatus 100. The counting unit 531 also counts the number of times of firmware updates, and the number of times of short-distance wireless communication by the NFC device 772. The counting unit 531 stores, in the storage unit 69, the count values obtained by the counting, as various numbers of times.

On the basis of the various numbers of times stored in the storage unit 69, the determination unit 532 executes prediction processing that predicts the life of each of the TPM device 54 and the NFC device 772. The determination unit 532 is an example of a predicting unit. In a case where the determination unit 532 determines that the TPM device 54 has a short life, the determination unit 532 outputs, to the warning-issuing unit 533, information indicating that a warning is to be issued, and information indicating that the replacement of the TPM device 54 is to be prompted. In a case where the determination unit 532 determines that the NFC device 772 has a short life, the determination unit 532 outputs, to the warning-issuing unit 533, information indicating that a warning is to be issued, and information indicating that the replacement of the NFC device 772 is to be prompted.

In a case where the warning-issuing unit 533 receives, from the determination unit 532, the information indicating that a warning is to be issued, and the information indicating that the replacement of the TPM device 54 or the NFC device 772 is to be prompted, the warning-issuing unit 533 issues the received information and the warning to the operation unit 77.

The sleep shift timer 534 measures the time of a non-operation state during the standby mode. In a case where the duration of the non-operation state during the standby mode exceeds a sleep shift time set for the sleep shift timer 534, the CPU 53 makes a transition of the operation mode of the image forming apparatus 100 from the standby mode to the energy-saving mode. For example, the sleep shift time for the transition from the standby mode to the energy-saving mode is set by a user operating the operation unit 77. The energy-saving mode has smaller power consumption than the standby mode, and is also referred to as a sleep mode.

The human-sensor-setting unit 535 sets the human sensor 775 to an effective state or an ineffective state.

The effective state or the ineffective state of the human sensor 775 may be set by a user operating the operation unit 77. The human-sensor-setting unit 535 may be implemented by the CPU 771 of the operation unit 77.

The priority-application-setting unit 536 sets a priority application screen to be displayed on the display 773 after the image forming apparatus 100 is activated, when the ADF 41 is opened, or in other such situations. That is, the priority-application-setting unit 536 sets an initial screen to be displayed on the display 773 when the power supply is activated, or when the user operates the image forming apparatus 100. As a result, the trouble that the user has with selecting a desired function from a plurality of functions mounted in the image forming apparatus 100 is improved.

In the operation unit 77, the CPU 771 controls operations of the NFC device 772, the display 773, the keyboard 774, and the human sensor 775, and transmits and receives information to and from the control board 51. The display 773 displays various types of information, such as a cursor, a menu, a window, characters, or an image. The keyboard 774 has a plurality of keys (software keys) for inputting characters, numerical values, various instructions, and the like.

In a case where the human-sensor-setting unit 535 sets the human sensor 775 to the effective state, the human sensor 775 operates. When the human sensor 775 senses the approach of a person to the operation unit 77, the human sensor 775 notifies the CPU 771. In a case where the human sensor 775 is set to the ineffective state, the human sensor 775 does not operate. Therefore, even in a case where a person approaches the operation unit 77, the human sensor 775 does not notify the CPU 771.

In a case where the image forming apparatus 100 is in the energy-saving mode, and the CPU 771 receives the notification from the human sensor 775, the CPU 771 makes the operation unit 77 make a transition from the energy-saving mode to a pre-return mode. When during the pre-return mode, the CPU 771 receives user operation for activating an engine mechanism, such as the printer unit 6 and the conveying unit 8, the CPU 771 makes a transition from the pre-return mode to the standby mode, and notifies the CPU 53 of the transition from the pre-return mode to the standby mode. On the basis of the notification of the transition, the CPU 53 makes the control board 51 shift from the pre-return mode to the standby mode.

The network I/F 73 is connected to an external server 300 and a remote management apparatus 400 via a network 200, such as the Internet.

For example, the external server 300 acquires various types of information from the image forming apparatus 100 and the like connected to the network 200. In a case where a total value SUM1, which will be described with reference to FIGS. 6 and 7, exceeds a first threshold, the CPU 53 may transmit, to the external server 300, the various numbers of times for the TPM device 54 stored in the storage unit 69. In a case where a total value SUM2, which will be described with reference to FIGS. 8 and 9, exceeds a second threshold, the CPU 53 may transmit, to the external server 300, the various numbers of times for the NFC device 772 stored in the storage unit 69.

The CPU 53 may periodically transmit (upload), to the external server 300, the various numbers of times for the TPM device 54 and the various numbers of times for the NFC device 772 stored in the storage unit 69. As a result, the external server 300 that receives the various numbers of times for the TPM device 54 and the various numbers of times for the NFC device 772 remotely determines the state of the image forming apparatus 100. For example, the external server 300 may be installed in a service base where the image forming apparatus 100 is maintained. Alternatively, the external server 300 may be implemented with cloud computing.

The remote management apparatus 400 remotely manages the image forming apparatus 100 via the network 200 to grasp the status of the image forming apparatus 100 in real time. According to the grasped status, the remote management apparatus 400 performs repair or the like of the image forming apparatus 100.

The external server 300 and the remote management apparatus 400 may not be connected to the image forming apparatus 100.

The CPU 53 may acquire, via the network I/F 73, information of a TPM device 54 and information of an NFC device 772 mounted in another information processing apparatus (for example, another image forming apparatus) connected to the network 200. As a result, the image forming apparatus 100 may exchange the information of the TPM device 54 and the information of the NFC device 772 with another information processing apparatus.

Example of State Transition of Image Forming Apparatus

Figure 4:
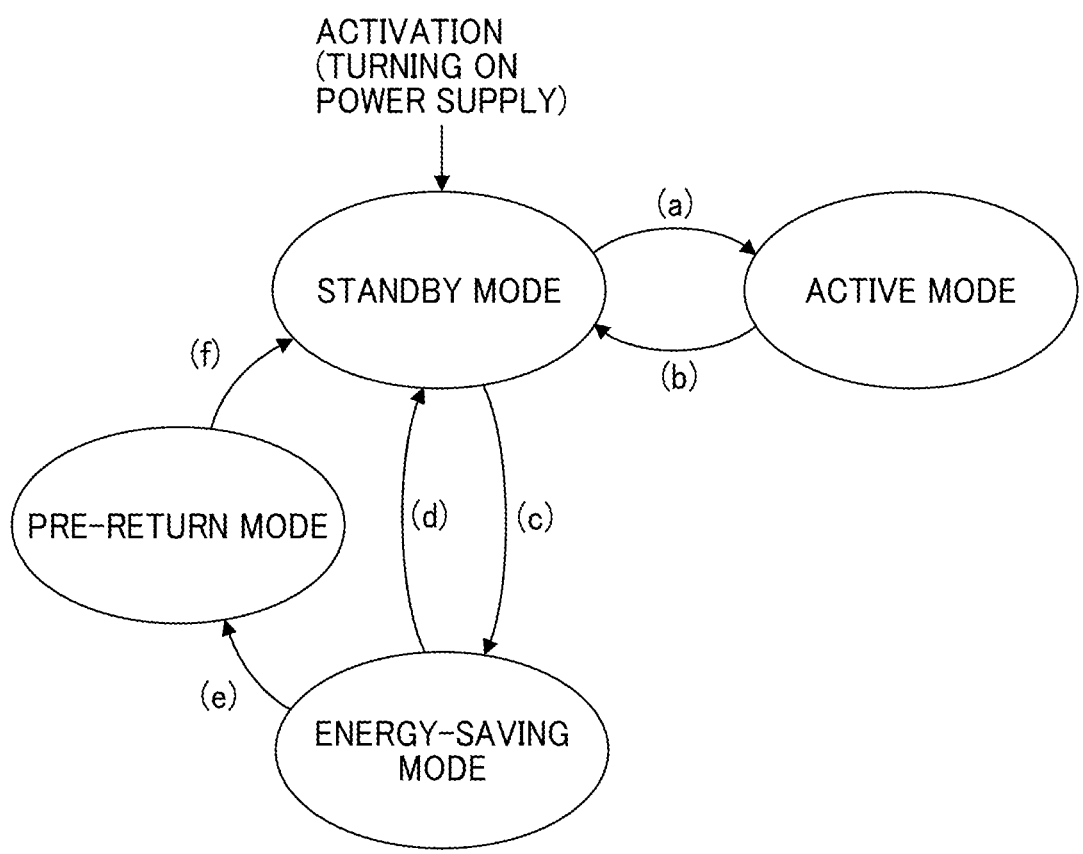
FIG. 4 is a state transition diagram illustrating an example of transitions of operation modes of the image forming apparatus of FIG. 1.

FIG. 4 is a state transition diagram illustrating an example of transitions of operation modes of the image forming apparatus 100 of FIG. 1. The transitions of the operation modes of the image forming apparatus 100 are controlled by, for example, the CPU 53 of FIG. 2. When the image forming apparatus 100 is activated by turning on the power switch, the image forming apparatus 100 is set to the standby mode. The standby mode is an example of a normal mode.

In a case where during the standby mode, the image forming apparatus 100 receives an instruction, such as copying or scanning, from the user via the operation unit 77, the image forming apparatus 100 makes a transition to an active mode and performs a copying operation (that is, a printing operation) or a scanning operation ((a) in FIG. 4). After the copying operation or the scanning operation ends, the image forming apparatus 100 returns to the standby mode ((b) in FIG. 4).

In a case where in the standby mode, a non-operation state continues for a predetermined time, the image forming apparatus 100 makes a transition from the standby mode to the energy-saving mode ((c) in FIG. 4). The time of a non-operation state for making a transition from the standby mode to the energy-saving mode is set by the sleep shift timer 534.

For example, in a case where during the energy-saving mode, the ADF 41 is opened, the image forming apparatus 100 makes a transition of the operation mode to the standby mode ((d) in FIG. 4). In a case where during the energy-saving mode, the human sensor 775 set to the effective state senses a person, the image forming apparatus 100 makes a transition of the operation mode to the pre-return mode ((e) in FIG. 4). In a case where during the pre-return mode, the image forming apparatus 100 receives user operation for activating the engine mechanism, the image forming apparatus 100 makes a transition of the operation mode to the standby mode ((f) in FIG. 4).

In the standby mode, the control board 51, the engine control unit 79, and the operation unit 77 are all set to an ON state. Due to the ON state of the engine control unit 79, the printer unit 6 and the scanner unit 42 are set to a standby state. In the pre-return mode, the control board 51 and the operation unit 77 are set to the ON state, and the engine control unit 79 is set to an OFF state. However, in the pre-return mode, even when the operation unit 77 is set to the ON state, the panel display unit 77a (liquid crystal display unit) is set to an OFF state. In the energy-saving mode, the control board 51, the engine control unit 79, and the operation unit 77 are all set to an OFF state.

Example of Various Numbers of Times Stored in Storage Unit

FIG. 5 is an explanatory diagram illustrating an example of various numbers of times stored in the storage unit 69 of FIG. 3. Preferably, the various numbers of times are held in a non-volatile memory not to be lost when the power supply is shut off.

Allocated to the storage unit 69 are a storage area A1 for prediction of the life of the TPM device 54, and a storage area A2 for prediction of the life of the NFC device 772. The storage area A1 includes an area for storing the number of times BT1 of activation, the number of times STR1 of shifts to energy saving, the number of times STB1 of shifts to standby, and the number of times FWU1 of firmware updates. The storage area A2 includes an area for storing the number of times BT2 of activation, the number of times STR2 of shifts to energy saving, the number of times STB2 of shifts to standby, and the number of times NFU2 of wireless communication.

The numbers of times BT1 and BT2 of activation indicate the number of times of activation of the power supply of the image forming apparatus 100. After the activation of the power supply of the image forming apparatus 100, the counting unit 531 of FIG. 3 adds "1" to each of the numbers of times BT1 and BT2 of activation held in the storage unit 69.

The numbers of times STR1 and STR2 of shifts to energy saving indicate the number of times of shifts from the standby mode to the energy-saving mode, and are set to the same value. In a case where the operation mode is made to shift from the standby mode to the energy-saving mode, the counting unit 531 adds "1" to each of the numbers of times STR1 and STR2 of shifts to energy saving held in the storage unit 69. The numbers of times STB1 and STB2 of shifts to standby indicate the number of times of shifts from the energy-saving mode to the standby mode, and are set to the same value. In a case where the operation mode is made to shift from the energy-saving mode to the standby mode, the counting unit 531 adds "1" to each of the numbers of times STB1 and STB2 of shifts to standby held in the storage unit 69.

The number of times FWU1 of firmware updates indicates the number of times of updates of the firmware executed by the CPU 53. Every time the firmware is updated, the counting unit 531 adds "1" to the number of times FWU1 of firmware updates held in the storage unit 69. The number of times of wireless communication indicates the number of times of short-distance wireless communication by the NFC device 772. Every time the NFC device 772 executes short-distance wireless communication, the counting unit 531 adds "1" to the number of times NFU2 of wireless communication held in the storage unit 69.

Example of Processing that Predicts Life of TPM Device

Figure 6:
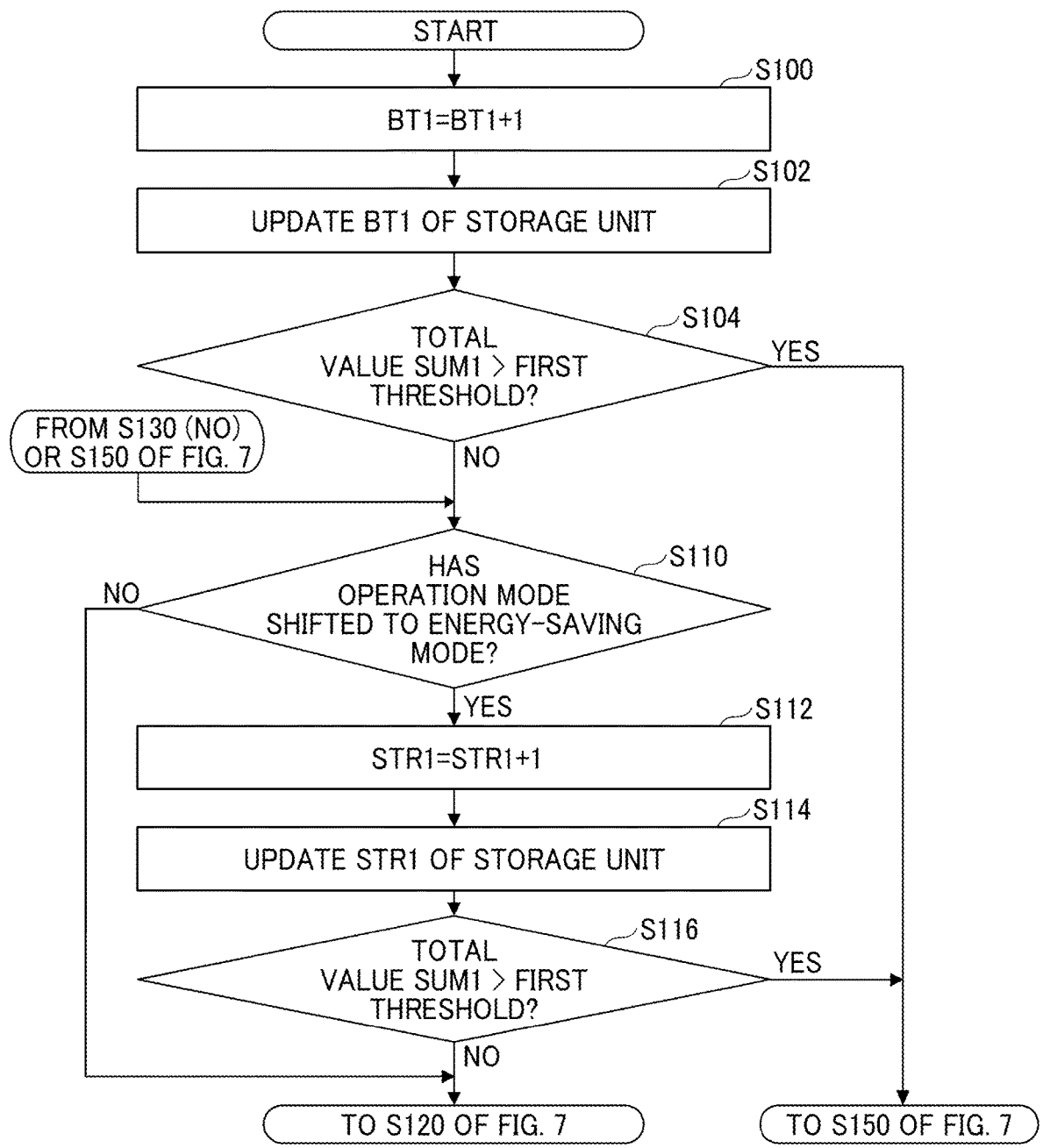
FIG. 6 is a flowchart illustrating an example of processing that predicts the life of a trusted platform module (TPM) device by a determination unit of FIG. 3.
Figure 7:
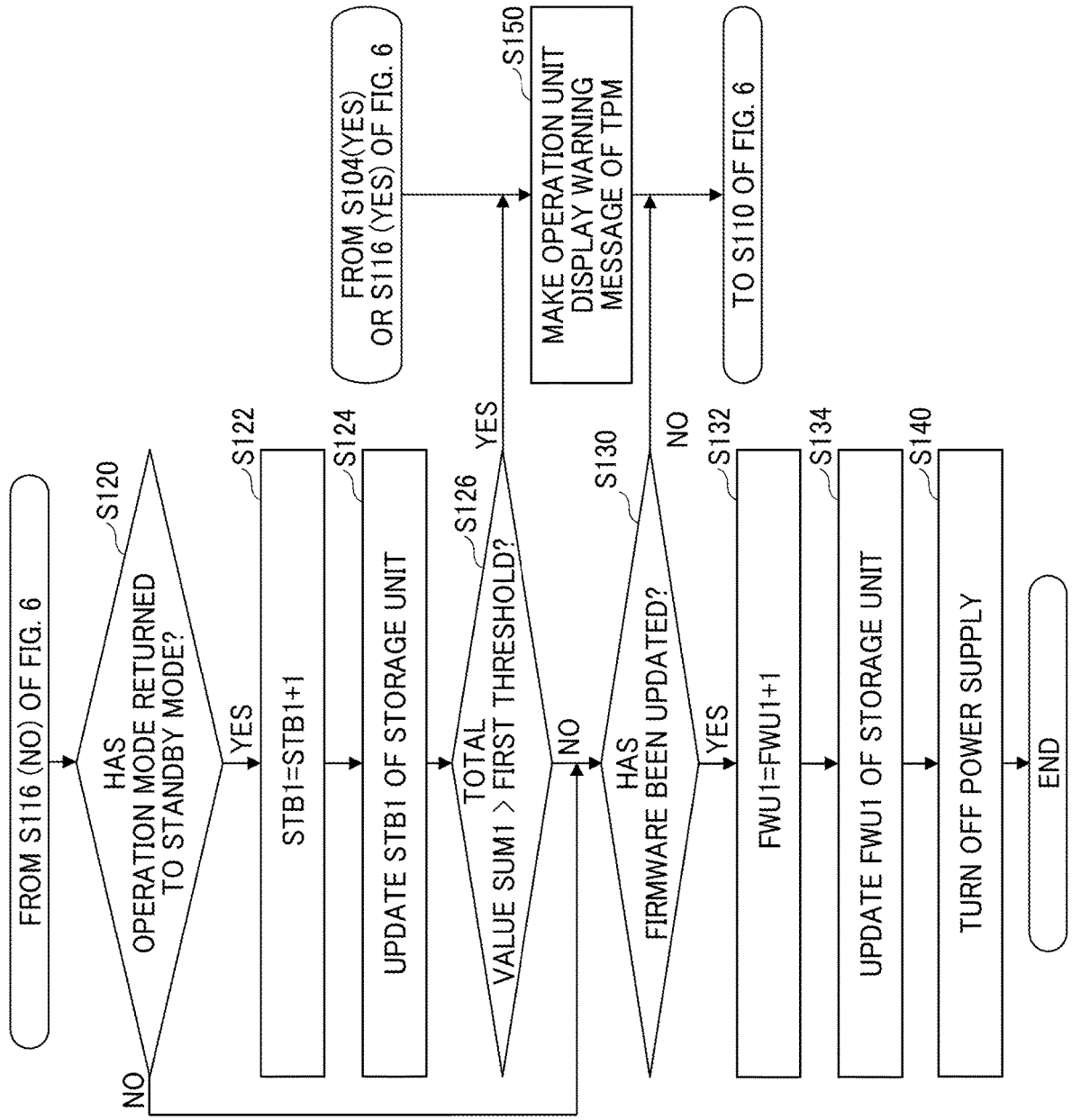
FIG. 7 is a flowchart illustrating a continuation of the processing that predicts the life of the TPM device of FIG. 6.

FIGS. 6 and 7 are flowcharts illustrating an example of processing that predicts the life of the TPM device 54 by the determination unit 532 of FIG. 3. That is, FIGS. 6 and 7 illustrate an example of a method for controlling the image forming apparatus 100 and the information processing apparatus. The operations illustrated in FIGS. 6 and 7 are performed by, for example, the CPU 53 executing a control program, and are started on the basis of activation of the power supply of the image forming apparatus 100.

First, in step S100, the CPU 53 reads the number of times BT1 of activation held in the storage unit 69, and adds "1" to the read number of times BT1 of activation to increase the count value by "1". Next, in step S102, the CPU 53 writes, into the storage unit 69, the added number of times BT1 of activation to update the number of times BT1 of activation of the storage unit 69.

Next, in step S104, the CPU 53 calculates a total value SUM1 of the number of times BT1 of activation, the number of times STR1 of shifts to energy saving, the number of times STB1 of shifts to standby, and the number of times FWU1 of firmware updates held in the area A1 (FIG. 5) for prediction of the life of the TPM device 54.

Then the CPU 53 determines whether or not the total value SUM1 is larger than a preset first threshold.

In a case where the total value SUM1 is larger than the first threshold, the CPU 53 determines that the TPM device 54 has a short life, and the CPU 53 makes the processing shift to step S150 of FIG. 7. In a case where the total value SUM1 is equal to or smaller than the first threshold, the CPU 53 determines that the TPM device 54 has a sufficient life, and the CPU 53 makes the processing shift to step S110.

The first threshold is determined on the basis of, for example, a product standard value of the TPM device 54, and is used to determine the life of the TPM device 54 in a simulation manner. For example, in a case where in the product standard value of the TPM device 54, the upper limit value of the number of times of writing is 100,000 times, the first threshold may be set to 90,000 times.

In step S110, the CPU 53 determines whether or not the operation mode has shifted from the standby mode to the energy-saving mode. In a case where the operation mode has shifted to the energy-saving mode, the CPU 53 makes the processing shift to step S112. In a case where the operation mode has not shifted to the energy-saving mode, the CPU 53 makes the processing shift to step S120 of FIG. 7.

In step S112, the CPU 53 reads the number of times STR1 of shifts to energy saving held in the storage unit 69, and adds "1" to the read number of times STR1 of shifts to energy saving to increase the count value by "1". Next, in step S114, the CPU 53 writes, into the storage unit 69, the added number of times STR1 of shifts to energy saving to update the number of times STR1 of shifts to energy saving of the storage unit 69.

Next, in step S116, the CPU 53 calculates a total value SUM1 as in step S104, and determines whether or not the total value SUM1 is larger than the preset first threshold. In a case where the total value SUM1 is larger than the first threshold, the CPU 53 makes the processing shift to step S150 of FIG. 7. In a case where the total value SUM1 is equal to or smaller than the first threshold, the CPU 53 makes the processing shift to step S120 of FIG. 7.

In step S120 of FIG. 7, the CPU 53 determines whether or not the operation mode has returned from the energy-saving mode to the standby mode. In a case where the operation mode has returned to the standby mode, the CPU 53 makes the processing shift to step S122. In a case where the operation mode has not returned to the standby mode, the CPU 53 makes the processing shift to step S130.

In step S122, the CPU 53 reads the number of times STB1 of shifts to standby held in the storage unit 69, and adds "1" to the read number of times STB1 of shifts to standby to increase the count value by "1". Next, in step S124, the CPU 53 writes, into the storage unit 69, the added number of times STB1 of shifts to standby to update the number of times STB1 of shifts to standby of the storage unit 69.

Next, in step S126, the CPU 53 calculates a total value SUM1 as in step S104, and determines whether or not the total value SUM1 is larger than the preset first threshold. In a case where the total value SUM1 is larger than the first threshold, the CPU 53 makes the processing shift to step S150. In a case where the total value SUM1 is equal to or smaller than the first threshold, the CPU 53 makes the processing shift to step S130.

In step S130, the CPU 53 determines whether or not the firmware has been updated. In a case where the firmware has been updated, the CPU 53 makes the processing shift to step S132. In a case where the firmware has not been updated, the CPU 53 makes the processing shift to step S110 of FIG. 6.

In step S132, the CPU 53 reads the number of times FWU1 of firmware updates held in the storage unit 69, and adds "1" to the read number of times FWU1 of firmware updates to increase the count value by "1". Next, in step S134, the CPU 53 writes, into the storage unit 69, the added number of times FWU1 of firmware updates to update the number of times FWU1 of firmware updates of the storage unit 69. Next, in step S140, the CPU 53 turns off the power supply of the image forming apparatus 100, and ends the processing illustrated in FIGS. 6 and 7. Thereafter, in a case where the power supply of the image forming apparatus 100 is activated again, the processing of step S100 of FIG. 6, and processing of step S200 of FIG. 8 described later are performed.

In step S150, the CPU 53 issues a warning indicating that the replacement of the TPM device 54 is to be prompted, to the CPU 771 of the operation unit 77 via the warning-issuing unit 533. The CPU 771 that has received the warning displays, on the display 773, a warning message prompting the replacement of the TPM device 54. After step S150, the CPU 53 shifts to step S110 of FIG. 6.

As described above, in a case where a total value SUM1, which is the number of times of occurrence of factors of writing of the change information into the TPM device 54, exceeds the first threshold, the CPU 53 makes the display 773 display a warning message prompting the replacement of the TPM device 54. As a result, the image forming apparatus 100 predicts the life of the TPM device 54 whose life cannot be predicted by Self-Monitoring Analysis and Reporting Technology (SMART) or the like.

Example of Processing that Predicts Life of NFC Device

Figure 8:
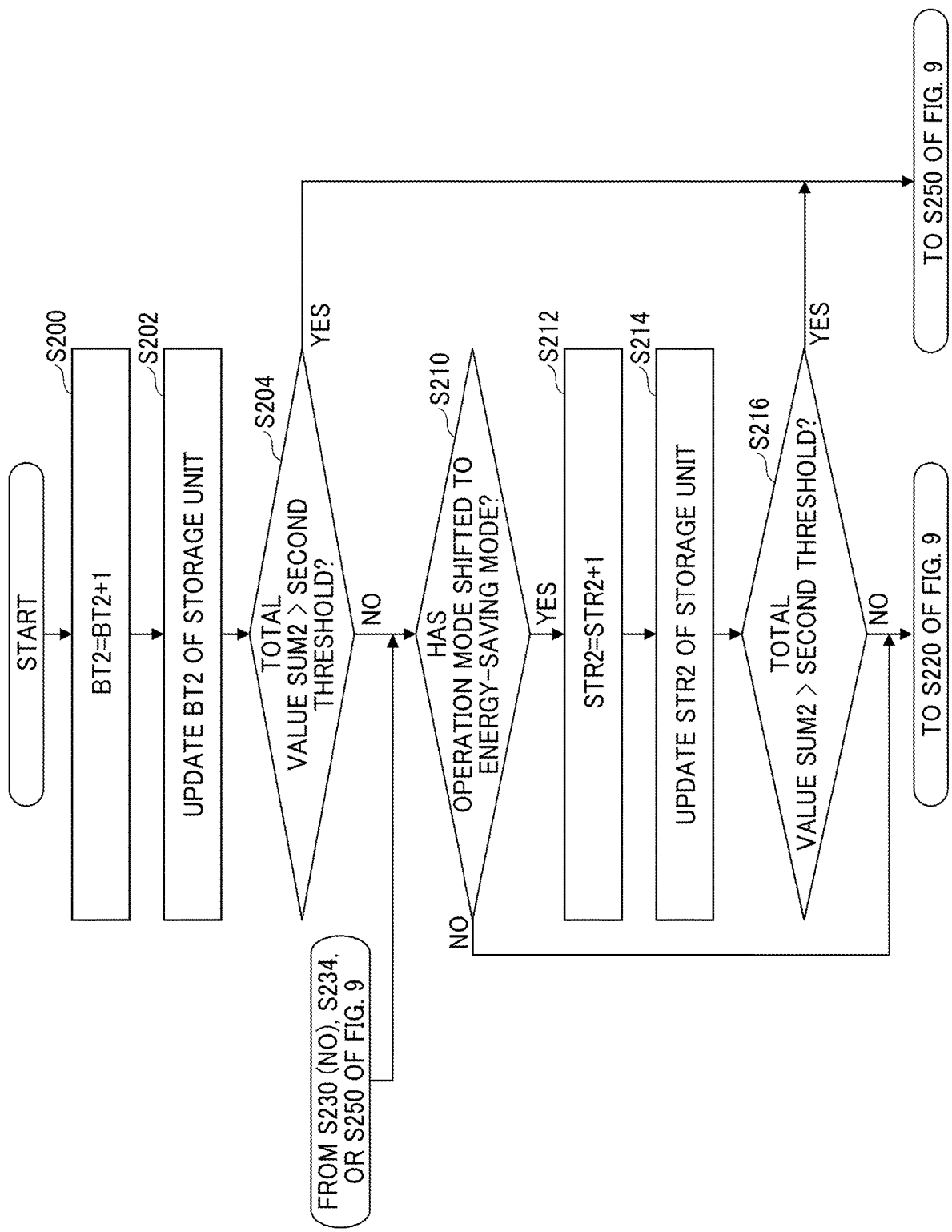
FIG. 8 is a flowchart illustrating an example of processing that predicts the life of a near-field communication (NFC) device by the determination unit of FIG. 3.
Figure 9:
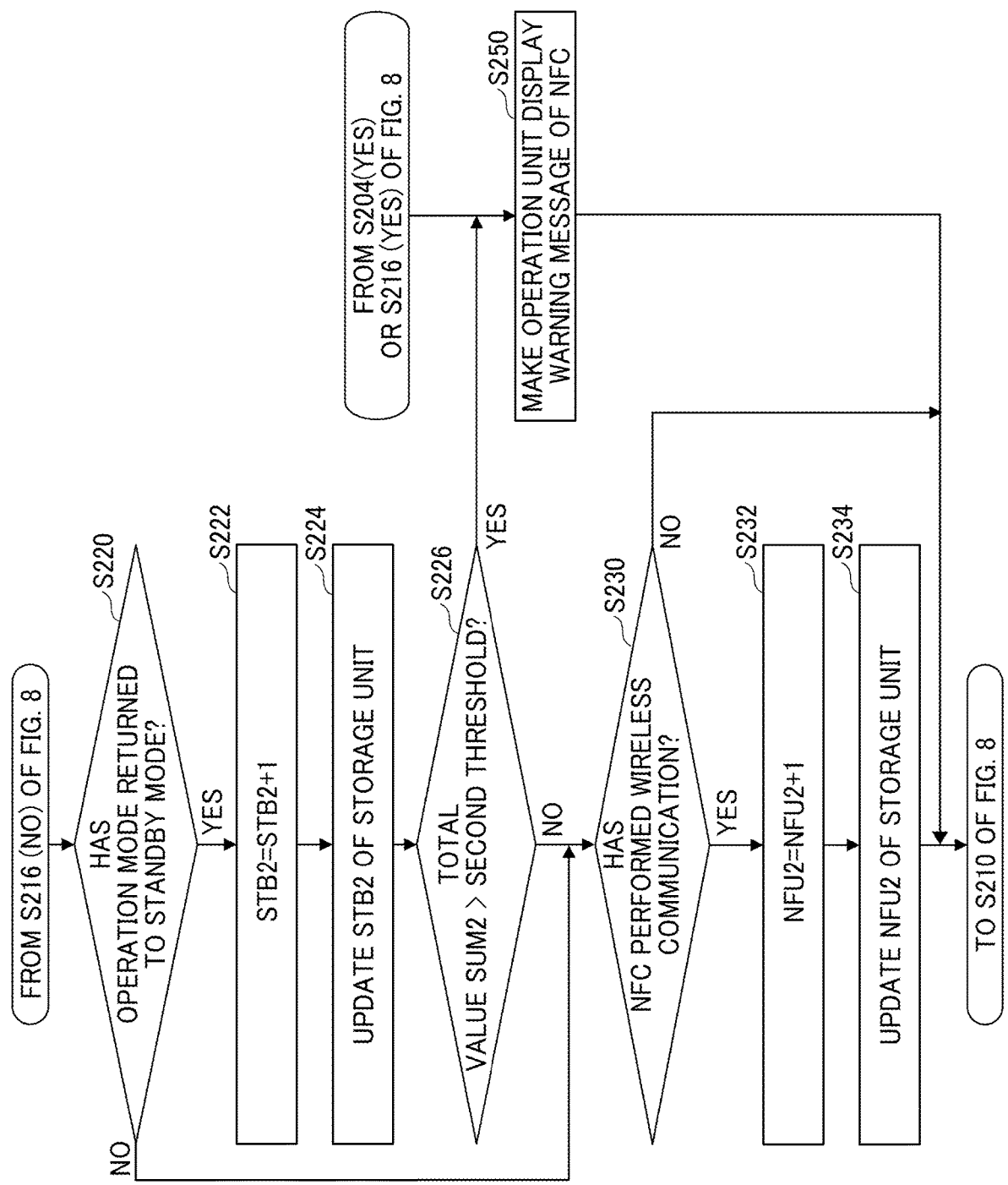
FIG. 9 is a flowchart illustrating a continuation of the processing that predicts the life of the NFC device of FIG. 8.

FIGS. 8 and 9 are flowcharts illustrating an example of processing that predicts the life of the NFC device 772 by the determination unit 532 of FIG. 3. That is, FIGS. 8 and 9 illustrate an example of a method for controlling the image forming apparatus 100 and the information processing apparatus. The operations illustrated in FIGS. 8 and 9 are performed by, for example, the CPU 53 executing a control program, and are started on the basis of activation of the power supply of the image forming apparatus 100. That is, the processing illustrated in FIGS. 8 and 9 is performed in parallel with the processing illustrated in FIGS. 6 and 7.

First, in step S200, the CPU 53 reads the number of times BT2 of activation held in the storage unit 69, and adds "1" to the read number of times BT2 of activation to increase the count value by "1". Next, in step S202, the CPU 53 writes, into the storage unit 69, the added number of times BT2 of activation to update the number of times BT2 of activation of the storage unit 69.

Next, in step S204, the CPU 53 calculates a total value SUM2 of the number of times BT2 of activation, the number of times STR2 of shifts to energy saving, the number of times STB2 of shifts to standby, and the number of times NFU2 of wireless communication held in the area A2 (FIG. 5) for prediction of the life of the NFC device 772. Then the CPU 53 determines whether or not the total value SUM2 is larger than a preset second threshold.

In a case where the total value SUM2 is larger than the second threshold, the CPU 53 determines that the NFC device 772 has a short life, and the CPU 53 makes the processing shift to step S250 of FIG. 9. In a case where the total value SUM2 is equal to or smaller than the second threshold, the CPU 53 determines that the NFC device 772 has a sufficient life, and the CPU 53 makes the processing shift to step S210.

The second threshold is determined on the basis of, for example, a product standard value of the NFC device 772, and is used to determine the life of the NFC device 772 in a simulation manner. For example, the second threshold may be set to 90% of the upper limit value of the number of times of communication in the product standard value of the NFC device 772.

In step S210, the CPU 53 determines whether or not the operation mode has shifted from the standby mode to the energy-saving mode. In a case where the operation mode has shifted to the energy-saving mode, the CPU 53 makes the processing shift to step S212. In a case where the operation mode has not shifted to the energy-saving mode, the CPU 53 makes the processing shift to step S220 of FIG. 9.

In step S212, the CPU 53 reads the number of times STR2 of shifts to energy saving held in the storage unit 69, and adds "1" to the read number of times STR2 of shifts to energy saving to increase the count value by "1". Next, in step S214, the CPU 53 writes, into the storage unit 69, the added number of times STR2 of shifts to energy saving to update the number of times STR2 of shifts to energy saving of the storage unit 69.

Next, in step S216, the CPU 53 calculates a total value SUM2 as in step S204, and determines whether or not the total value SUM2 is larger than the preset second threshold. In a case where the total value SUM2 is larger than the second threshold, the CPU 53 makes the processing shift to step S250 of FIG. 9. In a case where the total value SUM2 is equal to or smaller than the second threshold, the CPU 53 makes the processing shift to step S220 of FIG. 9.

In step S220 of FIG. 9, the CPU 53 determines whether or not the operation mode has returned from the energy-saving mode to the standby mode. In a case where the operation mode has returned to the standby mode, the CPU 53 makes the processing shift to step S222. In a case where the operation mode has not returned to the standby mode, the CPU 53 makes the processing shift to step S230.

In step S222, the CPU 53 reads the number of times STB2 of shifts to standby held in the storage unit 69, and adds "1" to the read number of times STB2 of shifts to standby to increase the count value by "1". Next, in step S224, the CPU 53 writes, into the storage unit 69, the added number of times STB2 of shifts to standby to update the number of times STB2 of shifts to standby of the storage unit 69.

Next, in step S226, the CPU 53 calculates a total value SUM2 as in step S204, and determines whether or not the total value SUM2 is larger than the preset second threshold. In a case where the total value SUM2 is larger than the second threshold, the CPU 53 makes the processing shift to step S250. In a case where the total value SUM2 is equal to or smaller than the second threshold, the CPU 53 makes the processing shift to step S230.

In step S230, the CPU 53 determines whether or not the NFC device 772 has performed short-distance wireless communication. In a case where the NFC device 772 has performed short-distance wireless communication, the CPU 53 makes the processing shift to step S232. In a case where the NFC device 772 has not performed short-distance wireless communication, the CPU 53 makes the processing shift to step S210 of FIG. 8.

In step S232, the CPU 53 reads the number of times NFU2 of wireless communication held in the storage unit 69, and adds "1" to the read number of times NFU2 of wireless communication to increase the count value by "1". Next, in step S234, the CPU 53 writes, into the storage unit 69, the added number of times NFU2 of wireless communication to update the number of times NFU2 of wireless communication of the storage unit 69, and makes the processing shift to step S210 of FIG. 8.

In step S250, the CPU 53 issues a warning indicating that the replacement of the NFC device 772 is to be prompted, to the CPU 771 of the operation unit 77 via the warning-issuing unit 533. The CPU 771 that has received the warning displays, on the display 773, a warning message prompting the replacement of the NFC device 772. After step S250, the CPU 53 shifts to step S210 of FIG. 8.

As described above, in a case where a total value SUM2, which is the number of times of occurrence of factors of writing of the change information into the NFC device 772, exceeds the second threshold, the CPU 53 makes the display 773 display a warning message prompting the replacement of the NFC device 772. As a result, the image forming apparatus 100 predicts the life of the NFC device 772 whose life cannot be predicted by SMART or the like.

The CPU 53 may calculate, as a total value SUM2, a total value of the number of times BT1 of activation, the number of times STR1 of shifts to energy saving, the number of times STB1 of shifts to standby, and the number of times NFU2 of wireless communication. In this case, the storage unit 69 may not be provided with an area for storing the number of times BT2 of activation, the number of times STR2 of shifts to energy saving, and the number of times STB2 of shifts to standby. In this case, steps S200, S202, S212, and S214 of FIG. 8, and steps S222 and S224 of FIG. 9 may be omitted.

Figure 10:
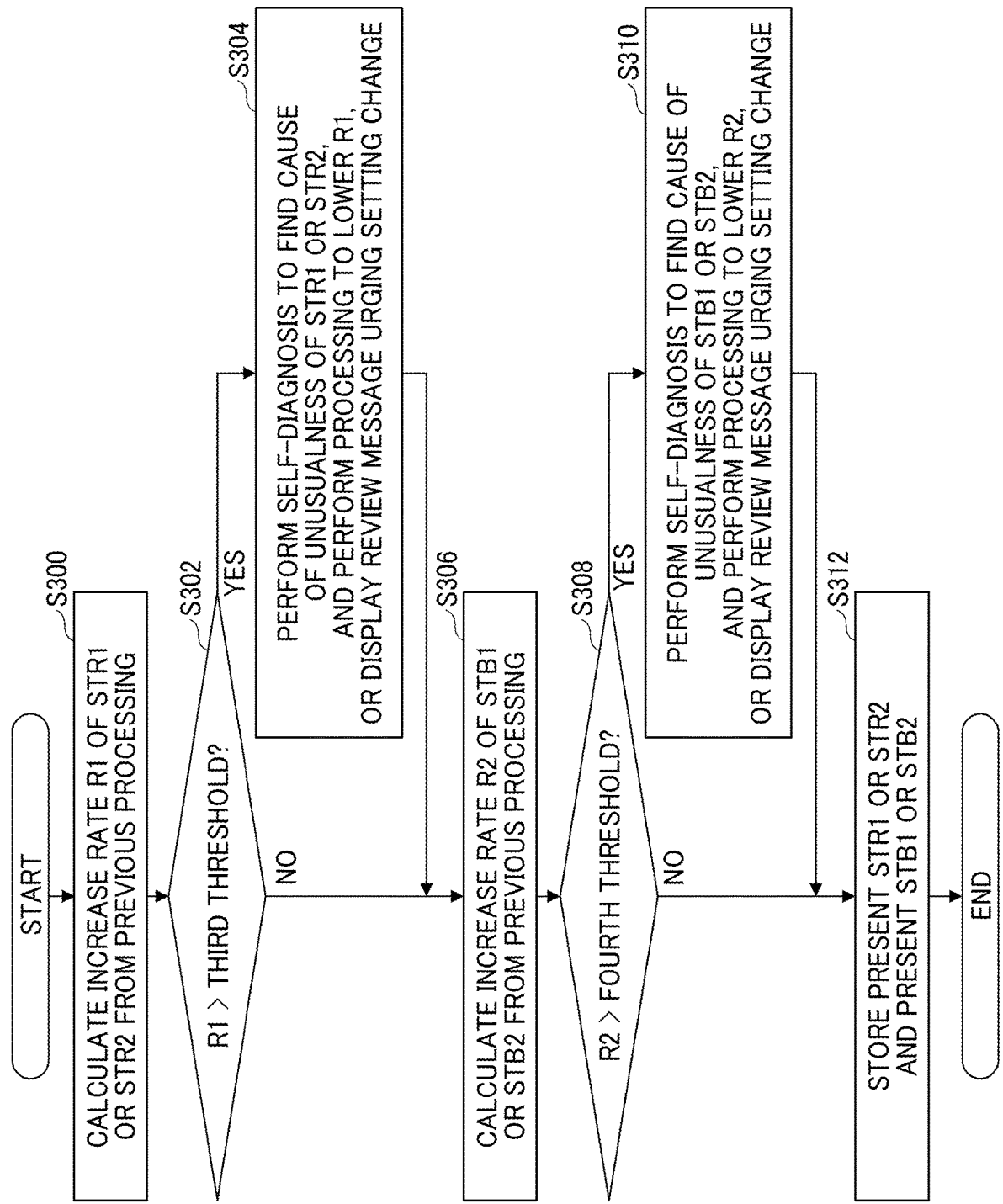
FIG. 10 is a flowchart illustrating an example of determination processing that determines whether or not there is an unusualness in the number of times of shifts to energy saving, and the number of times of shifts to standby.

Example of Determination Processing that Determines Unusualness of Number of Times of Shifts to Energy Saving and Number of Times of Shifts to Standby FIG. 10 is a flowchart illustrating an example of determination processing that determines whether or not there is an unusualness in the number of times STR1 or STR2 of shifts to energy saving, and the number of times STB1 or STB2 of shifts to standby. The processing illustrated in FIG. 10 is executed by the CPU 53 in a predetermined cycle while the image forming apparatus 100 is activated. That is, the CPU 53 executes the processing illustrated in FIG. 10 in parallel with the processing illustrated in FIGS. 6 to 9. The processing illustrated in FIG. 10 may be executed by the determination unit 532. The CPU 53 or the determination unit 532 that executes the processing illustrated in FIG. 10 functions as a self-diagnosis unit.

First, in step S300, for either of the numbers of times STR1 and STR2 of shifts to energy saving, the CPU 53 calculates an increase rate R1 from the previous processing of FIG. 10. Since the numbers of times STR1 and STR2 of shifts to energy saving are the same, the CPU 53 may use either of the numbers of times STR1 and STR2 of shifts to energy saving.

Next, in step S302, the CPU 53 determines whether or not the increase rate R1 is larger than a third threshold. In a case where the increase rate R1 is larger than the third threshold, the CPU 53 makes the processing shift to step S304. In a case where the increase rate R1 is equal to or smaller than the third threshold, the CPU 53 makes the processing shift to step S306.

For example, the third threshold is set to an increase rate for a case where the number of times STR1 or STR2 of shifts to energy saving reaches 90% of the upper limit value of the number of times of writing in a product standard value of the TPM device 54 or the NFC device 772 at a time of the end of the product life of the image forming apparatus 100. Preferably, the third threshold is set using the smaller one of the upper limits of the numbers of times of writing into the TPM device 54 and the NFC device 772.

For example, in the average operation of the image forming apparatus 100, it is assumed that the increase rate R1 of the number of times STR1 or STR2 of shifts to energy saving is about half of the third threshold. Therefore, the increase rate R1 of the number of times STR1 or STR2 of shifts to energy saving exceeding the third threshold indicates that the number of times of writing into the TPM device 54 or the NFC device 772 is larger than at the normal time.

In a case where the increase rate R1 is larger than the third threshold, there is a possibility that before the life of the image forming apparatus 100 ends, the number of times of writing into the TPM device 54 or the NFC device 772 exceeds the upper limit value, and the life of the TPM device 54 or the NFC device 772 ends. In a case where the increase rate R1 is equal to or smaller than the third threshold, there is a low possibility that before the life of the image forming apparatus 100 ends, the number of times of writing into the TPM device 54 or the NFC device 772 exceeds the upper limit value, and the life of the TPM device 54 or the NFC device 772 ends.

In step S304, the CPU 53 performs self-diagnosis to find a cause of the increase rate R1 of the number of times STR1 or STR2 of shifts to energy saving being larger than the third threshold. Then in a case where the CPU 53 diagnoses that the cause of the unusualness (that is, the deterioration in the life prediction precision) is the operation of the image forming apparatus 100, the CPU 53 performs processing to reduce the increase rate R1.

For example, in a case where there is a failure in which even though there has been no shift to the energy-saving mode, the number of times STR1 of shifts to energy saving increases, and the number of times STR1 of shifts to energy saving is larger than the number of times STR2 of shifts to energy saving, there is a fear that the increase rate R1, which is originally normal, may exceed the third threshold.

In this case, the CPU 53 performs a correction to rewrite the number of times STR1 of shifts to energy saving held in the storage unit 69, to a normal value according to the number of times STR2 of shifts to energy saving. As a result, the increase rate R1 is made equal to or smaller than the third threshold, and an erroneous message is prevented from being displayed on the display 773.

In a case where the CPU 53 diagnoses that the cause of the unusualness is due to the settings of the image forming apparatus 100, the CPU 53 determines that the number of times STR1 or STR2 of shifts to energy saving is not appropriate. In this manner, the CPU 53 diagnoses the appropriateness of the number of times STR1 or STR2 of shifts to energy saving. Then the CPU 53 makes the display 773 display a setting-review message for reducing the increase rate R1, and makes the processing shift to step S306.

For example, in a case where the sleep shift time, which is a time taken by a shift of the operation mode from the standby mode to the energy-saving mode, is extremely short, the frequency of switching between the standby mode and the energy-saving mode is high. Therefore, in a case where the sleep shift time, which is a time taken by a shift of the operation mode from the standby mode to the energy-saving mode, is extremely short, the CPU 53 determines that the sleep shift time is the cause of the unusual increase rate R1.

In this case, the CPU 53 makes the display 773 display a review message prompting an extension of the sleep shift time. The sleep shift time is extended, so that the frequency of shifts of the operation mode from the standby mode to the energy-saving mode is reduced, and the increase rate R1 is reduced.

Therefore, a deterioration, due to the numbers of times STR1 and STR2 of shifts to energy saving, in the prediction precision of the determination unit 532 that predicts the lives of the TPM device 54 and the NFC device 772 is suppressed. As a result, the display of a warning message prompting the replacement of the TPM device 54 or the NFC device 772 whose life has not ended is suppressed. Consequently, originally unnecessary serviceperson calls and part replacement are reduced, and the occurrence of useless cost is suppressed.

In step S306, for either of the numbers of times STB1 and STB2 of shifts to standby, the CPU 53 calculates an increase rate R2 from the previous processing of FIG. 10. Since the numbers of times STB1 and STB2 of shifts to standby are the same, the CPU 53 may use either of the numbers of times STB1 and STB2 of shifts to standby.

Next, in step S308, the CPU 53 determines whether or not the increase rate R2 is larger than a fourth threshold. In a case where the increase rate R2 is larger than the fourth threshold, the CPU 53 makes the processing shift to step S310. In a case where the increase rate R2 is equal to or smaller than the fourth threshold, the CPU 53 makes the processing shift to step S312.

For example, the fourth threshold is set to an increase rate for a case where the number of times STB1 or STB2 of shifts to standby reaches 90% of the upper limit value of the number of times of writing in a product standard value of the TPM device 54 or the NFC device 772 at a time of the end of the product life of the image forming apparatus 100. Preferably, the fourth threshold is set using the smaller one of the upper limits of the numbers of times of writing into the TPM device 54 and the NFC device 772.

For example, in the average operation of the image forming apparatus 100, it is assumed that the increase rate R2 of the number of times STB1 or STB2 of shifts to standby is about half of the fourth threshold. Therefore, the increase rate R2 of the number of times STB1 or STB2 of shifts to standby exceeding the fourth threshold indicates that the number of times of writing into the TPM device 54 or the NFC device 772 is larger than at the normal time.

In a case where the increase rate R2 is larger than the fourth threshold, there is a possibility that before the life of the image forming apparatus 100 ends, the number of times of writing into the TPM device 54 or the NFC device 772 exceeds the upper limit value, and the life of the TPM device 54 or the NFC device 772 ends. In a case where the increase rate R2 is equal to or smaller than the fourth threshold, there is a low possibility that before the life of the image forming apparatus 100 ends, the number of times of writing into the TPM device 54 or the NFC device 772 exceeds the upper limit value, and the life of the TPM device 54 or the NFC device 772 ends.

In step S310, the CPU 53 performs self-diagnosis to find a cause of the increase rate R2 of the number of times STB1 or STB2 of shifts to standby being larger than the fourth threshold. Then in a case where the CPU 53 diagnoses that the cause of the unusualness (that is, the deterioration in the life prediction precision) is the operation of the image forming apparatus 100, the CPU 53 performs processing to reduce the increase rate R2.

For example, in a case where there is a failure in which even though there has been no shift to the standby mode, the number of times STB1 of shifts to standby increases, and the number of times STB1 of shifts to standby is larger than the number of times STB2 of shifts to standby, there is a fear that the increase rate R2, which is originally normal, may exceed the fourth threshold.

In this case, the CPU 53 performs a correction to rewrite the number of times STB1 of shifts to standby held in the storage unit 69, to a normal value according to the number of times STB2 of shifts to standby. As a result, the increase rate R2 is made equal to or smaller than the fourth threshold, and an erroneous message is prevented from being displayed on the display 773.

In a case where the CPU 53 diagnoses that the cause of the unusualness is due to the settings of the image forming apparatus 100, the CPU 53 determines that the number of times STB1 or STB2 of shifts to standby is not appropriate. In this manner, the CPU 53 diagnose the appropriateness of the number of times STB1 or STB2 of shifts to standby. Then the CPU 53 makes the display 773 display a setting-review message for reducing the increase rate R2, and makes the processing shift to step S312.

For example, in a case where the frequency of detection of a person by the human sensor 775 set to the effective state is extremely high, the frequency of switching between the standby mode and the energy-saving mode is high. Therefore, in a case where the frequency of detection of a person by the human sensor 775 set to the effective state is extremely high, the CPU 53 determines that the extremely high frequency is the cause of the unusual increase rate R2.

In this case, the CPU 53 makes the display 773 display a review message prompting the human sensor 775 to be set to the ineffective state. As a result, the frequency of returns of the operation mode from the energy-saving mode to the standby mode is reduced, and the increase rate R2 of the number of times STB1 or STB2 of shifts to standby is reduced.

As a result, for example, even in a case where the ADF 41 is opened during the energy-saving mode, the frequency of returns of the operation mode from the energy-saving mode to the standby mode is reduced, and the increase rate R2 of the number of times STB1 or STB2 of shifts to standby is reduced.

Therefore, a deterioration, due to the numbers of times STB1 and STB2 of shifts to standby, in the prediction precision of the determination unit 532 that predicts the lives of the TPM device 54 and the NFC device 772 is suppressed. As a result, the display of a warning message prompting the replacement of the TPM device 54 or the NFC device 772 whose life has not ended is suppressed. Consequently, originally unnecessary serviceperson calls and part replacement are reduced, and the occurrence of useless cost is suppressed.

In step S312, the CPU 53 stores, in a non-volatile memory, the present number of times STR1 or STR2 of shifts to energy saving, and the present number of times STB1 or STB2 of shifts to standby held in the storage unit 69. The non-volatile memory that stores the present number of times STR1 or STR2 of shifts to energy saving, and the number of times STB1 or STB2 of shifts to standby may be the ROM 69a of the storage unit 69. For example, the present number of times STR1 or STR2 of shifts to energy saving, and the present number of times STB1 or STB2 of shifts to standby may be stored in a storage area adjacent to the storage areas A1 and A2 illustrated in FIG. 5.

When the processing flow illustrated in FIG. 10 is performed for the first time, the previous number of times STR1 or STR2 of shifts to energy saving, and the previous number of times STB1 or STB2 of shifts to standby are not stored. Therefore, for example, the CPU 53 may perform only step S312 without performing the processing from step S300 to step S310. As a result, an erroneous increase rate R1 calculated due to step S300 is prevented, and an erroneous increase rate R2 calculated due to step S306 is prevented.

When the processing flow illustrated in FIG. 10 is performed for the first time, the CPU 53 may set the present number of times STR1 or STR2 of shifts to energy saving, to the previous number of times STR1 or STR2 of shifts to energy saving, and may set the present number of times STB1 or STB2 of shifts to standby, to the previous number of times STB1 or STB2 of shifts to standby.

As described above, in the present embodiment, a deterioration, due to the numbers of times STR1 and STR2 of shifts to energy saving or the numbers of times STB1 and STB2 of shifts to standby, in the prediction precision of the determination unit 532 that predicts the lives of the TPM device 54 and the NFC device 772 is suppressed. As a result, the display of a warning message prompting the replacement of the TPM device 54 or the NFC device 772 whose life has not ended is suppressed. Consequently, originally unnecessary serviceperson calls and part replacement are reduced, and the occurrence of useless cost is suppressed.

For example, in a case where the sleep shift time, which is a time taken by a shift of the operation mode from the standby mode to the energy-saving mode, is extremely short, the CPU 53 makes the display 773 display a review message prompting an extension of the sleep shift time. The sleep shift time is extended, so that the frequency of shifts of the operation mode from the standby mode to the energy-saving mode is reduced, and the increase rate R1 is reduced.

In a case where the frequency of detection of a person by the human sensor 775 set to the effective state is extremely high, the CPU 53 makes the display 773 display a review message prompting the human sensor 775 to be set to the ineffective state. As a result, the frequency of returns of the operation mode from the energy-saving mode to the standby mode is reduced, and the increase rate R2 of the number of times STB1 or STB2 of shifts to standby is reduced.

In a case where a copying application is set as a priority application, and the frequency of returns to the standby mode is high, the CPU 53 makes the display 773 display a review message prompting the setting of the copying application to be ceased. As a result, for example, even in a case where the ADF 41 is opened during the energy-saving mode, the frequency of returns to the standby mode is reduced, and the increase rate R2 of the number of times STB1 or STB2 of shifts to standby is reduced.

For example, in a case where there is a failure in which even though there has been no shift to the energy-saving mode, the number of times STR1 of shifts to energy saving increases, the CPU 53 performs a correction to rewrite the number of times STR1 of shifts to energy saving held in the storage unit 69, to a normal value, so that the number of times STR1 of shifts to energy saving matches the number of times STR2 of shifts to energy saving. As a result, the increase rate R1 is made equal to or smaller than the third threshold, and an erroneous message is prevented from being displayed on the display 773.

For example, in a case where there is a failure in which even though there has been no shift to the standby mode, the number of times STB1 of shifts to standby increases, the CPU 53 performs a correction to rewrite the number of times STB1 of shifts to standby held in the storage unit 69, to a normal value, so that the number of times STB1 of shifts to standby matches the number of times STB2 of shifts to standby. As a result, the increase rate R2 is made equal to or smaller than the fourth threshold, and an erroneous message is prevented from being displayed on the display 773.

In a case where a total value SUM1, which is the number of times of occurrence of factors of writing of the change information into the TPM device 54, exceeds the first threshold, the CPU 53 displays, on the display 773, a warning message prompting the replacement of the TPM device 54. In a case where a total value SUM2, which is the number of times of occurrence of factors of writing of the change information into the NFC device 772, exceeds the second threshold, the CPU 53 displays, on the display 773, a warning message prompting the replacement of the NFC device 772. As a result, among the parts mounted in the image forming apparatus 100, the lives of the TPM device 54 and the NFC device 772 whose lives cannot be predicted by SMART or the like are predicted.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. The elements of the above-described embodiments can be modified without departing from the gist of the present disclosure, and can be appropriately determined according to the application form.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus configured to switch a normal mode and an energy-saving mode with less power consumption than the normal mode, the information processing apparatus comprising:
control circuitry configured to control processing of the information processing apparatus;
an operation unit including a display; and
a first device and a second device mounted on the control circuitry or the operation unit, the first device and second device configured to write change information indicating change of an operation mode of the information processing apparatus in response to switching between the normal mode and the energy-saving mode, the first device and the second device having a first limit and a second limit respectively to a number of times of writing,
the control circuitry configured to:
count the number of times of writing of the change information into the first device;
count the number of times of writing of the change information into the second device;
predict a life of the first device on a basis of a first count value of the number of times of writing of the change information for the first device;
predict a life of the second device on a basis of a second count value of the number of times of writing of the change information for the second device;
diagnose appropriateness of the first count value used for prediction of the life of the first device and appropriateness of the second count value used for prediction of the life of the second device when a first increase rate of the first count value or a second increase rate of the second count value exceeds a predetermined increase rate; and
correct the first count value according to the second count value so that the increase rate of the first count value is equal to or smaller than the predetermined increase rate, when the increase rate of the first count value exceeds the predetermined increase rate.

2. The information processing apparatus according to claim 1,
wherein the control circuitry is configured to display, on the display, a message that prompts a reduction in frequency of the switching between the normal mode and the energy-saving mode, when the control circuitry diagnoses that a high frequency of the switching between the normal mode and the energy-saving mode is a cause of an increase in the increase rate.

3. The information processing apparatus according to claim 1,
wherein the control circuitry is configured to display on the display, a message that prompts replacement of the first device, when the number of times of writing for the first device counted by the control circuitry exceeds a predetermined number of times, and
wherein the control circuitry is configured to display on the display, a message that prompts replacement of the second device, when the number of times of writing for the second device counted by the control circuitry exceeds the predetermined number of times.

4. An image forming apparatus configured to switch between a normal mode and an energy-saving mode with less power consumption than the normal mode, the image forming apparatus comprising:
an image former configured to form an image;
control circuitry configured to control an operation of the image former;
an operation unit including a display; and
a first device and a second device mounted on the control circuitry or the operation unit, the first device and second device configured to write change information indicating change of an operation mode of the image forming apparatus in response to switching between the normal mode and the energy-saving mode, the first device and the second device having a first limit and a second limit respectively to a number of times of writing,
the control circuitry configured to:
count the number of times of writing of the change information into the first device;
count the number of times of writing of the change information into the second device;
predict a life of the first device on a basis of a first count value of the number of times of writing of the change information for the first device;

predict a life of the second device on a basis of a second count value of the number of times of writing of the change information for the second device;

diagnose appropriateness of the first count value used for prediction of the life of the first device and appropriateness of the second count value used for prediction of the life of the second device, when a first increase rate of the first count value or a second increase rate of the second count value exceeds a predetermined increase rate; and correct the first count value according to the second count value so that the increase rate of the first count value is equal to or smaller than the predetermined increase rate, when the increase rate of the first count value exceeds the predetermined increase rate.

5. A method for controlling an information processing apparatus that includes control circuitry and an operation unit with a display and switches between a normal mode and an energy-saving mode with less power consumption than the normal mode of the information processing apparatus, the method comprising:

writing change information indicating change of an operation mode of the information processing apparatus in response to switching between the normal mode and the energy-saving mode, into a first device having a first limit to a number of times of writing and into a second device having a second limit to a number of times of writing, counting the number of times of writing the change information to the first device and the second device, predicting a life of the first device on a basis of a first count value of the number of times of writing for the first device;

predict a life of the second device on a basis of a second count value of the number of times of writing of the change information for the second device;

diagnosing appropriateness of the first count value used for prediction of the life of the first device and appropriateness of the second count value used for prediction of the life of the second device, when a first increase rate of the first count value or a second increase rate of the second count value exceeds a threshold; and correct the first count value according to the second count value so that the increase rate of the first count value is equal to or smaller than the threshold, when the increase rate of the first count value exceeds the threshold.

6. The method according to claim 5, further comprising displaying a message that prompts a reduction in frequency of the switching between the normal mode and the energy-saving mode on the display, when the diagnosing determines that a high frequency of the switching between the normal mode and the energy-saving mode is a cause of an increase in the increase rate.

* * * * *